F. METCALFE.
COTTON CHOPPER.
APPLICATION FILED NOV. 22, 1910.
1,010,296.
Patented Nov. 28, 1911.
2 SHEETS—SHEET 2.
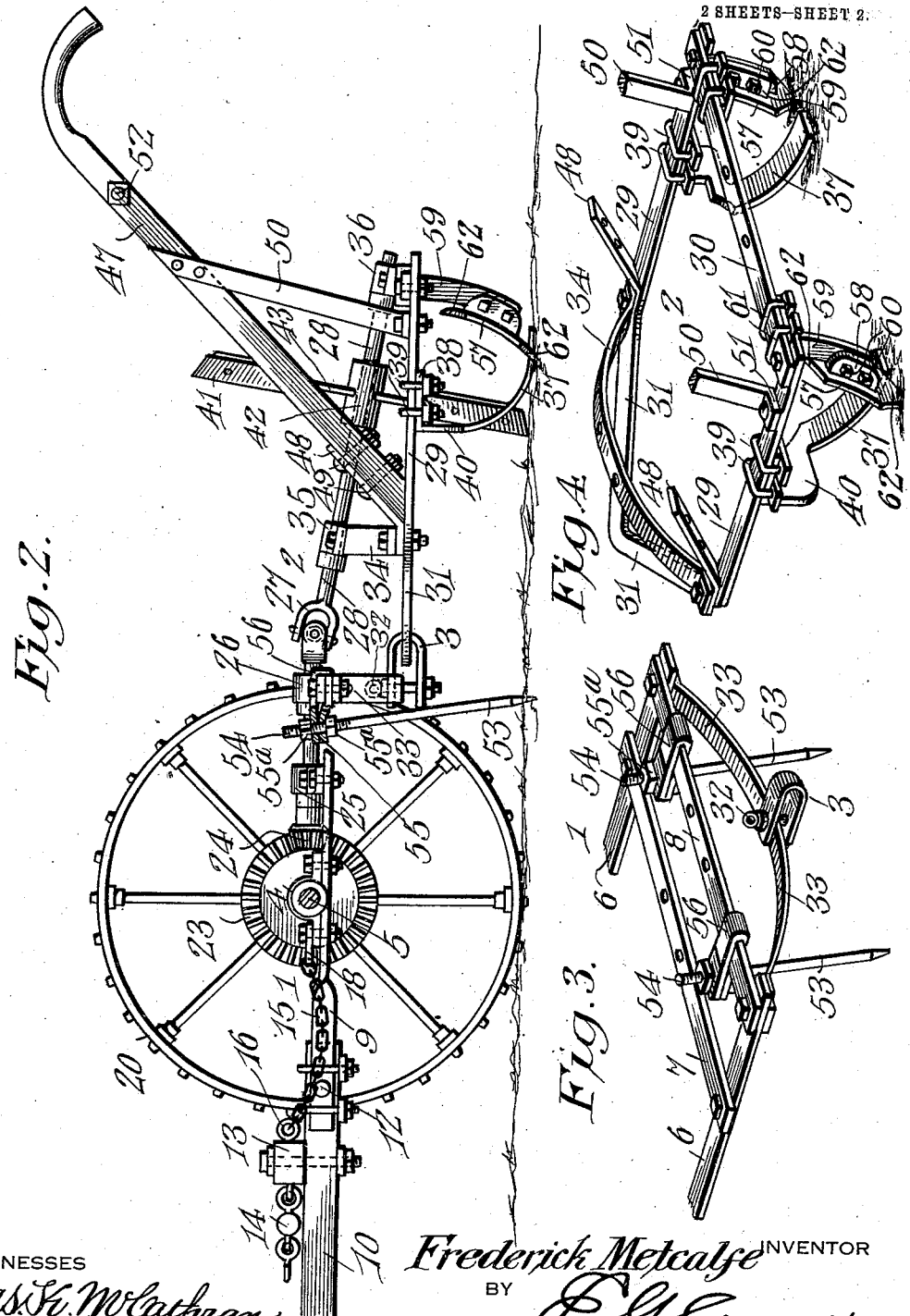
Frederick Metcalfe INVENTOR
BY 
ATTORNEY

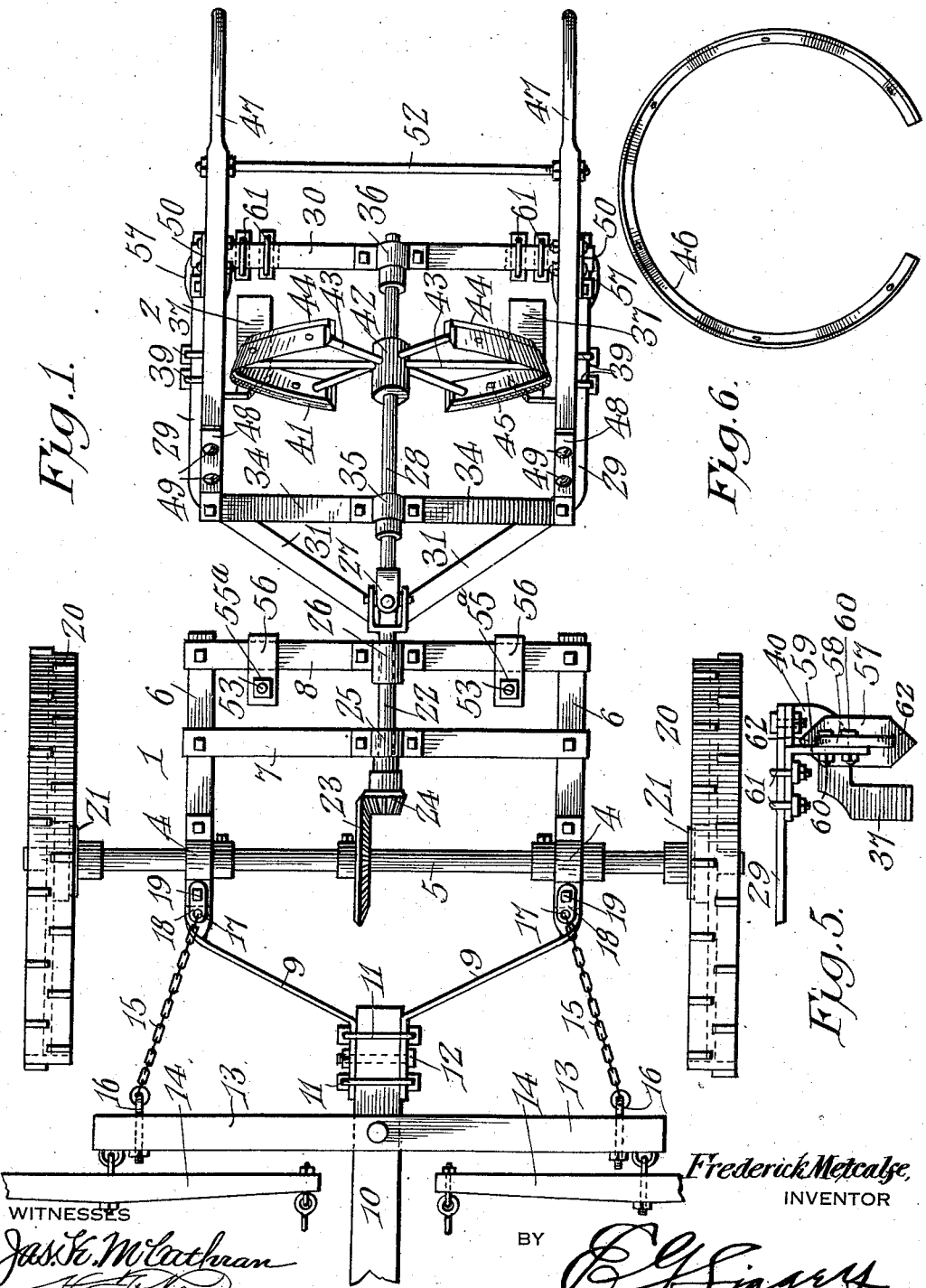

UNITED STATES PATENT OFFICE.

FREDERICK METCALFE, OF GREENVILLE, MISSISSIPPI.

COTTON-CHOPPER.

1,010,296.　　　　　Specification of Letters Patent.　　Patented Nov. 28, 1911.

Application filed November 22, 1910. Serial No. 593,688.

*To all whom it may concern:*

Be it known that I, FREDERICK METCALFE, a citizen of the United States, residing at Greenville, in the county of Washington and State of Mississippi, have invented a new and useful Cotton-Chopper, of which the following is a specification.

The invention relates to improvements in cotton choppers.

The object of the present invention is to improve the construction of cotton choppers and to provide a simple, efficient and comparatively inexpensive machine of this character, designed for chopping or blocking cotton, beets, corn, and other drilled vegetation requiring early cutting.

Another object of the invention is to provide a cotton chopper equipped with a rotary cutter having a curved blade, adapted to cut beneath the surface of the soil and utilize the forward movement of the machine to produce a shear cut in severing the plants.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of a cotton chopper, constructed in accordance with this invention. Fig. 2 is a side elevation of the same. Fig. 3 is a detail perspective view of the rear portion of the front frame. Fig. 4 is a detail perspective view of the rear frame. Fig. 5 is a rear elevation of one side of the rear frame, illustrating the arrangement of the runners and the cultivator blades. Fig. 6 is a detail view of a curved blade adapted to form a single space or opening at the periphery of the rotary cutter.

Like numerals of reference designate corresponding parts in all the figures of the drawings.

In the embodiment of the invention illustrated in the accompanying drawings, the cotton chopper comprises in its construction front and rear approximately rectangular frames 1 and 2, connected together by a clevis 3, which permits the rear frame to move both vertically and laterally independently of the front frame. The front frame, which is provided at opposite sides with bearings 4 for a transverse shaft or axle 5, is composed of side bars 6, connected at their rear portions by spaced transverse bars 7 and 8, and having forwardly converging front portions 9, secured to the rear end of a tongue 10. The terminals of the front portions, which are arranged parallel at opposite sides of the tongue, are secured to the same by clips 11 and a transverse bolt 12. The clips 11 are spaced apart, and the bolt pierces the terminals of the front portions 9 at a point between the clips. The tongue is equipped with a doubletree 13 carrying swingletrees 14, and connected with the side bars of the front frame by stay chains 15. The front ends of the chains 15 are secured to the end portions of the doubletree by eye bolts 16, and the rear ends of the chains 15 are linked into openings 17 of plates 18, which are mounted upon the bearings 4, being secured to the same by the bolts 19. The machine is drawn by two horses, or other draft animals, which are arranged at opposite sides of the row of plants operated on by the machine.

The transverse shaft or axle 5 is connected at its terminals with traction wheels 20 by suitable clutches 21, which engage the shaft or axle 5 during the forward rotation of the traction wheels and release the same when the traction wheels rotate rearwardly. The transverse shaft or axle is rotated only during the forward movement of the machine, and as any construction of clutch may be employed for this purpose, detail illustration thereof is deemed unnecessary.

Motion is communicated from the transverse shaft 5 to a horizontal front section 22 of a longitudinal shaft by a spur gear 23 and a spur pinion 24. The gear wheel 23 is fixed to the transverse shaft, and it meshes with the pinion, which is suitably secured to the front end of the longitudinal shaft. The front section 22 of the longitudinal shaft is journaled in centrally arranged longitudinally alined bearings 25 and 26 of the transverse bars 7 and 8, and it is connected at its rear end by a knuckle joint 27 with a rear inclined section 28 of the longitudinal shaft. The knuckle joint permits vertical and lateral movement of the rear inclined section of the longitudinal shaft to enable it to move with the rear frame.

The rear frame is composed of spaced side bars 29, connected at their rear ends by a transverse bar 30 and provided at their front ends with integral forwardly converging portions 31, forming a tapered or V-shaped front portion, which is arranged in the said clevis 3. The clevis 3, which is approximately U-shaped, is secured by a bolt 32 to a depending curved bar 33, secured to the rear ends of the side bars 29 and located beneath the rear transverse bar 8. The clevis is centrally arranged and is located in the vertical plane of the flexible joint 27 of the longitudinal shaft. The rear frame is located below the plane of the front frame, and the bar 33, which is bowed downwardly, supports the clevis 3 in the plane of the rear frame. The rear frame is provided at its front portion with an arched transverse bar 34, secured to the side bars 29 of the rear frame, which is equipped with front and rear bearings 35 and 36, mounted upon the arched bar 34 and upon the rear transverse bar 30, and receiving the rear inclined section 28 of the longitudinal shaft. The rear frame is supported by curved runners 37, extending downwardly and rearwardly from the side bars of the frame 2 at points intermediate of the ends thereof, and provided at their terminals with rearwardly extending shanks or attaching portions 38, fitted against the lower face of the side bars 29 and secured to the same by clips 39. The runners are provided at their upper portions with laterally extending arms 40, projecting inwardly from the shanks 38 and offsetting the runners from the vertical planes of the side bars 29.

The rear section 28 of the flexible longitudinal shaft carries a transversely disposed rotary chopper or cutter, set at an inclination and consisting of curved peripherally arranged blades 41, mounted upon a rotary frame or wheel consisting of a hub 42, radial spokes 43 and spaced rim sections 44 to which the curved blade is detachably secured by bolts 45, or other suitable fastening devices. The frame of the rotary chopper, which is set at an inclination, is adapted to receive either a pair of curved blades or a continuous curved blade 46. The curved blades 41, which are fitted against the outer faces of the rim sections, are spaced apart at their ends and provide opposite openings or spaces at the periphery of the chopper, and the continuous blade 46 provides a single space at the periphery of the chopper. The curved blade is provided with a front cutting edge, and the rim sections and the blade are cross sectionally inclined or set at an angle, the rotary cutter being tapered rearwardly, as clearly illustrated in Fig. 2 of the drawings. The rotary cutter is arranged to cut below the surface of the soil, preferably about the depth of an inch, and the rotary movement of the blade or blades combined with the forward movement of the machine results in a clear shear cut. When the blade is in the soil, it chops out or cuts the plants, and it skips and leaves standing other plants while it is clear of the ground. By varying the length of the cutting blade or blades and the relative size of the gears, the plants cut and the plants skipped may be varied, and the desired number of plants may be left standing the desired distance apart.

The rear frame is equipped with inclined handles 47, similar to those employed on an ordinary plow. The lower ends of the handles are secured to the frame by means of metallic straps 48, bolted or otherwise secured to the front edges or faces of the handles and having angularly bent front terminals, which are secured to the side bars 29 by the bolts 49, which fasten the ends of the arched bar 34 to the rear frame. The handles are supported at an intermediate point by braces 50, secured at their upper ends to the outer faces of the handles and having outwardly bent lower terminals 51, which are bolted to the upper faces of the side bars 29. The upper portions of the handles are also connected by a transverse rod or rung 52, having threaded terminals piercing the handles and provided with nuts arranged in pairs and engaging the inner and outer faces of the handles.

The front frame carries opposite harrow teeth 53, consisting of downwardly and rearwardly inclined rods, provided with lower pointed ends, adapted to penetrate the soil and break up the crust and pulverize at opposite sides of the plants. The upper portions 54 of the rods are threaded and extend through openings 55 of clamps 56. The clamps, which are approximately U-shaped, brace the rear transverse bar 8 and extend in advance of the same. The rods or teeth 53 pierce the front portions of the sides of the clamps, and the nuts 55$^a$ are arranged to engage the upper and lower sides of the clamps, and are adapted to permit a vertical adjustment of the rods and a lateral adjustment of the clamps. They enable the rods to be raised or lowered and adjusted toward and from each other so that they may operate the desired distance from the plants. The wheels of the front frame form rigid or unyielding supporting means for the same, so that when the rods or teeth 53 are adjusted, they will penetrate the soil at a uniform depth and will not be affected by any upward or downward movement of the yieldably mounted rear frame. The rear frame is also equipped with cultivator blades 57, provided at their rear faces with longitudinal flanges 58, and detachably secured to hangers or brackets 59 by bolts 60, or other suitable fastening devices. The hangers or brackets are substantially L-shaped, and have upper horizontal portions, which are secured to the lower face of the rear transverse bar 30 by clips 61. The hangers or brackets also have depending portions to which the flanges of the cultivator blades are secured. The cultivator blades are reversible, being provided with similar tapered terminal engaging portions 62. Any other desired form of cultivator blade or shovel may, however, be employed. The cultivator shovels are adjustably mounted on the rear frame by the clips 61, and adapted to be moved toward and from each other to arrange them the desired distance from the plants, and they may be located either outside or inside the runners, which extend in rear of the rotary cutter. The runners yieldably support the rear frame and are resilient to enable the frame to be readily depressed by the driver when desired. The flexible longitudinal shaft and the flexible connection between the front and rear frames afford the operator greater control of the cotton chopper, and enable the rotary chopper or cutter to be shifted laterally and to be raised and lowered to operate properly on the plants of crooked rows.

Having thus fully described my invention, what I claim as new and desire to secure by Letters Patent, is:—

1. A machine of the class described including front and rear flexibly connected frames, traction wheels forming rigid supporting means for the front frame, a central longitudinal shaft composed of flexibly connected sections mounted on the front and rear frames, gearing connecting the longitudinal shaft with the traction wheels, a rotary cotton chopper mounted on the longitudinal shaft and operating within the rear frame, runners located at opposite sides of the cotton chopper and yieldably supporting the rear frame, soil engaging devices located at opposite sides of the longitudinal shaft and carried by the front frame and supported by the same to run at a uniform depth, and handles connected with the rear frame for adjusting the same on the runners.

2. A machine of the class described including front and rear flexibly connected frames, traction wheels forming rigid supporting means for the front frame, a central longitudinal shaft composed of flexibly connected sections mounted on the front and rear frames, gearing connecting the longitudinal shaft with the traction wheels, a rotary cotton chopper mounted on the longitudinal shaft and operating within the rear frame, runners located at opposite sides of the cotton chopper and yieldably supporting the rear frame, soil engaging devices located at opposite sides of the longitudinal shaft and supported by the front frame to run at a uniform depth and adjustable upwardly and downwardly to vary such depth, and handles connected with the rear frame for adjusting the same on the runners.

3. A machine of the class described including front and rear frames arranged in different horizontal planes, the front frame being provided at the back with a pendant support, a clevis mounted on the pendant support and flexibly connecting the front and rear frames, wheels supporting the front frame, a longitudinal shaft composed of flexibly connected front and rear sections mounted, respectively, on the front and rear frames, the rear section of the longitudinal shaft being inclined and supported above the plane of the rear frame, and a rotary chopper mounted on the rear section of the longitudinal shaft and set at an inclination, and gearing for communicating motion from the wheels to the longitudinal shaft.

4. A machine of the class described including front and rear frames arranged in different horizontal planes, the front frame being provided with a pendant support, a clevis mounted on the pendant support and flexibly connecting the front and rear frames, wheels supporting the front frame, a longitudinal shaft composed of flexibly connected front and rear sections mounted, respectively, on the front and rear frames, the rear section of the longitudinal shaft being inclined, an arched member mounted on the rear frame and supporting the front portion of the rear inclined section of the longitudinal shaft, a rotary chopper mounted on the rear section of the said shaft and arranged at an inclination, and gearing for communicating motion from the wheels to the front section of the shaft.

5. A machine of the class described including front and rear frames arranged in different horizontal planes, the front frame being provided with a depending downwardly bowed supporting member, a clevis mounted on the supporting member and receiving the rear frame and forming a flexible connection between the said frames, a longitudinal shaft composed of front and rear flexibly connected sections mounted, respectively, on the front and rear frames, the rear section of the shaft being inclined, a rotary chopper mounted on the rear section of the shaft, wheels supporting the front frame, and gearing for communicating motion from the wheels to the front section of the shaft.

6. A machine of the class described including front and rear frames, the rear frame being arranged in a horizontal plane below the front frame and having a tapered front portion, a support depending from the back of the front frame, a clevis mounted on the support and receiving the tapered portion of the rear frame and forming a flexible connection between the frames, a flexible longitudinal shaft composed of front and rear sections mounted, respectively, on the front and rear frames, the rear section being inclined and supported above the plane of the rear frame, wheels supporting the front frame, a rotary chopper mounted on the rear section of the longitudinal shaft and set at an inclination, and gearing for communicating motion from the front wheels to the longitudinal shaft.

7. A machine of the class described including an approximately rectangular front frame provided at the back with a depending downwardly bowed supporting member, a rear frame arranged in a horizontal plane below that of the front frame, means for flexibly connecting the front of the rear frame with the downwardly bowed supporting member, traction wheels forming rigid supporting means for the front frame, an arched supporting member mounted on the rear frame at the front portion thereof, a longitudinal shaft composed of flexibly connected front and rear sections, the front section being mounted on the front frame and the rear section being supported at an inclination and in an elevated position above the rear frame by the said arched member, a rotary cotton chopper mounted on the rear section of the shaft, and gearing connecting the front section with the traction wheels.

8. A machine of the class described including front and rear frames arranged in different longitudinal planes, the front frame being provided at the back with a pendant support, a clevis mounted on the pendant support and flexibly connecting the front and rear frames, wheels supporting the front frame, a longitudinal shaft composed of flexibly connected sections mounted, respectively, on the front and rear frames, the rear section of the longitudinal shaft being inclined and supported above the plane of the rear frame, a rotary cotton chopper mounted on the rear section of the longitudinal shaft and set at an inclination, runners located at opposite sides of the rotary cotton chopper and yieldably supporting the rear frame, and gearing for communicating motion from the wheels to the longitudinal shaft.

9. A machine of the class described including front and rear flexibly coupled frames, traction wheels forming rigid supporting means for the front frame, a central longitudinal shaft composed of flexibly connected sections mounted on the front and rear frames, gearing connecting the longitudinal shaft with the traction wheels, a rotary cotton chopper mounted on the longitudinal shaft and operating within the rear frame, runners located at opposite sides of the cotton chopper and yieldably supporting the rear frame, handles connected with the rear frame, harrow teeth located in advance of the cotton chopper and mounted on the front frame at opposite sides of the longitudinal shaft and supported by the front frame to run at a uniform depth, and cultivator blades carried by the rear frame and located in rear of the cotton chopper.

10. A machine of the class described including front and rear flexibly coupled frames, traction wheels forming rigid supporting means for the front frame, a central longitudinal shaft composed of flexibly connected sections mounted on the front and rear frames, gearing connecting the longitudinal shaft with the traction wheels, a rotary cotton chopper mounted on the longitudinal shaft and operating within the rear frame, runners located at opposite sides of the cotton chopper and yieldably supporting the rear frame, handles connected with the rear frame, and inclined rods located in advance of the cotton chopper and arranged at opposite sides of the front frame and supported by the same to penetrate the soil at a uniform depth.

11. A machine of the class described including front and rear flexibly coupled frames, traction wheels forming rigid supporting means for the front frame, a central longitudinal shaft composed of flexibly connected sections mounted on the front and rear frames, gearing connecting the longitudinal shaft with the traction wheels, a rotary cotton chopper mounted on the longitudinal shaft and operating within the rear frame, runners located at opposite sides of the cotton chopper and yieldably supporting the rear frame, handles connected with the rear frame, inclined rods located in advance of the cotton chopper and arranged at opposite sides of the longitudinal shaft, and clamps mounted on the front frame securing the rods to the same and provided with means for permitting vertical and lateral adjustment of the said rods.

12. A machine of the class described including front and rear flexibly connected frames, wheels forming rigid supporting means for the front frame, a rotary chopper mounted on the rear frame, gearing for communicating motion from the wheels to the rotary chopper, said gearing having a flexible connection to permit movement of the rear frame, rods fixed to the front frame at opposite sides thereof and arranged to penetrate the soil, runners yieldably supporting the rear frame and located at opposite sides of the chopper, hangers adjustably mounted on the rear frame and located in rear of the rotary chopper, and cultivator blades secured to the hangers and located at the outer sides of the runners.

13. A machine of the class described including front and rear flexibly connected frames, wheels forming rigid supporting means for the front frame, runners located at opposite sides of the rear frame and curved downwardly and rearwardly from the same and provided at their upper ends with shanks secured to the rear frame, said runners yieldably supporting the rear frame and being also provided adjacent to the shanks with laterally projecting arms offsetting the runners from the vertical planes of the sides of the rear frame, chopping mechanism mounted on the rear frame and operating between the runners, and gearing for communicating motion from the wheels of the front frame to the chopping mechanism.

In testimony, that I claim the foregoing as my own, I have hereto affixed my signature in the presence of two witnesses.

FREDERICK METCALFE.

Witnesses:
J. F. MOORE,
W. F. FORDHAM.

Copies of this patent may be obtained for five cents each, by addressing the "Commissioner of Patents, Washington, D. C."